Nov. 23, 1954 G. E. WISE 2,694,877
FISH LURE AND METHOD OF MAKING SAME
Filed June 9, 1949
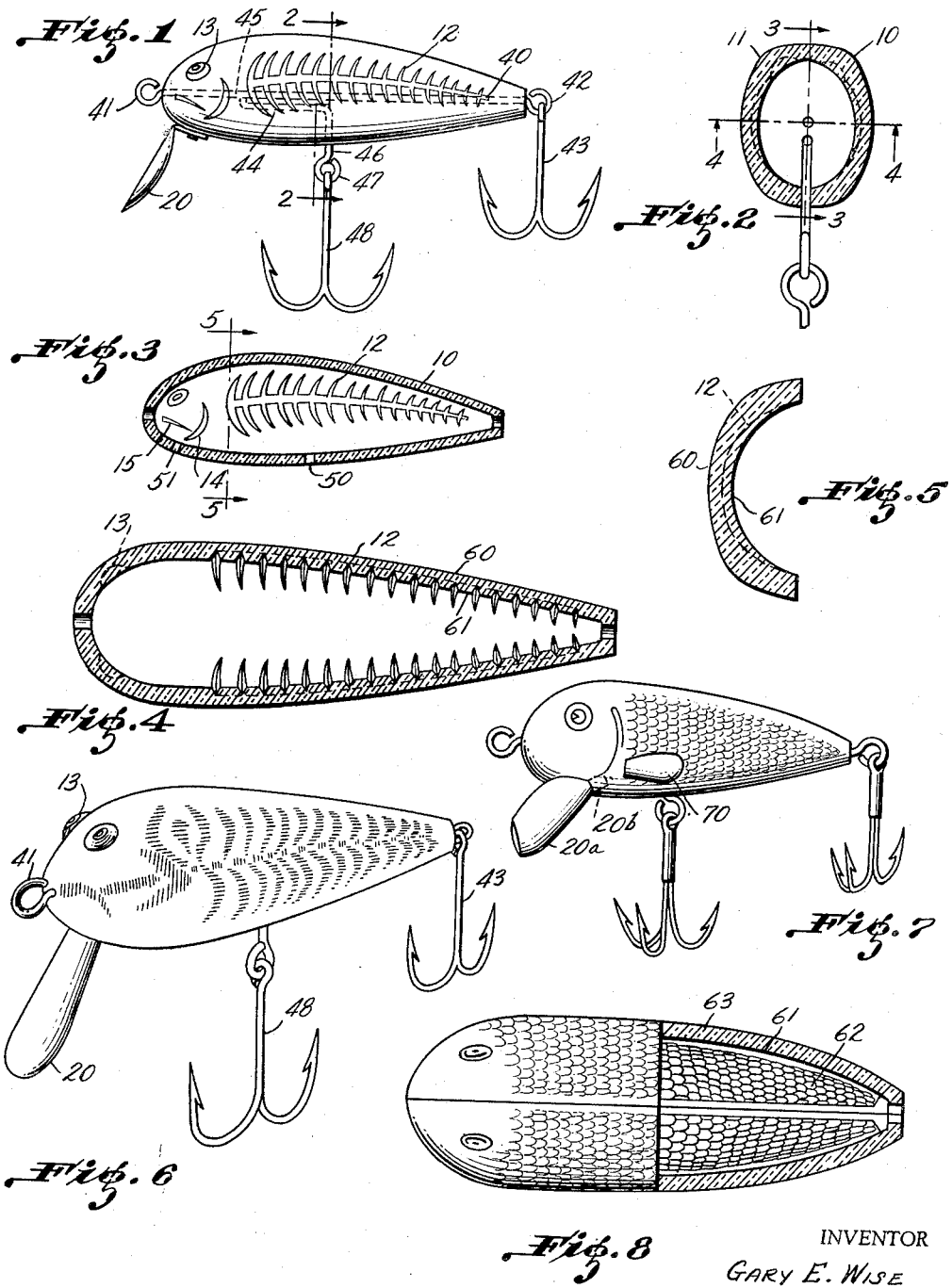
INVENTOR
GARY E. WISE
BY Slough and Slough
ATTORNEY

United States Patent Office 2,694,877
Patented Nov. 23, 1954

2,694,877

FISH LURE AND METHOD OF MAKING SAME

Gary E. Wise, Cleveland, Ohio, assignor to Holdenline Company, Cleveland, Ohio, a corporation of Ohio Application June 9, 1949, Serial No. 98,006

3 Claims. (Cl. 43—42.33)

My invention relates to an improved fish lure and relates more particularly to lures of the type molded from a plastic composition which is translucent, transparent or semi-transparent.

My invention further relates to an improved method for constructing such fish lures. The present lure differs primarily from others in that it emphasizes the characteristic markings, such as the skeletal structure, of a fish by internal decoration or intaglio markings on the interior walls of the lure body reflected through the generally translucent body.

It is an object of my invention therefore to provide a fish lure of the type referred to which will have interior markings rather than external markings wherefore the color and formation of the markings will be permanently protected.

Another object of my invention is to provide an improved fish lure of the type referred to which will substantially retain its initial brilliance and color.

A further object of my invention is to provide a lure of the type referred to by an improved method of manufacture entailing a saving in manufacture and cost.

A still further object of my invention is to produce a lure wherein the coloring of the lure is unaffected by air, abrasion, fish bites or the deleterious action of water upon the color.

Still further objects of my invention will become apparent from the description of the invention in conjunction with the accompanying drawings in which:

Fig. 1 is a side view of the improved lure of my invention showing in dotted lines the hook supporting line securing means;

Fig. 2 is a cross sectional view taken on the line 2—2 of Fig. 1;

Fig. 3 is a longitudinal sectional elevational view of the lure of my invention taken on the line 3—3 of Fig. 2 with the hook support omitted;

Fig. 4 is an enlarged sectional elevational view taken on the line 4—4 of Fig. 2;

Fig. 5 is an enlarged sectional view taken on the line 5—5 of Fig. 3;

Fig. 6 is a perspective view of the improved lure of my invention;

Fig. 7 is a side view of a modification of the lure of my invention;

Fig. 8 is a top view, partially in section of the lure of Fig. 7.

Referring now to the figures, in which all like parts are designated by like reference characters, my lure comprises a pair of symmetrical hollow sections 10 and 11, preferably identically formed and molded in any desired shape, such as that shown in the embodiment herein illustrated and described, from any of the well known plastic or transparent molding compositions now on the market. The plastic composition which is employed should be transparent or, at least, semi-transparent for purposes hereinafter described and is preferably uncolored or, at the least, lightly tinted. The external surface of the assembled lure has the characteristic shape of a simulated fish bait but is smooth and has substantially uninterrupted external surfaces.

During the molding process, I preferably form, in the embodiment of my invention shown in Figs. 1 to 6 inclusive, on the interior of each of the arcuate body portions of the lure in intaglio, characteristic markings such as the skeletal structure of the rib sections 12, fish eyes 13, gills 14, mouth 15, and similarly, any other marks could be added to these. All markings however, are formed on the internal surfaces of the body portions, except where the eyes, 13, may in an alternative embodiment, be formed so as to protrude from the external surface of the lure as shown in Figs. 1–6. A spoon, 20 may be mounted on the forward portion of the lure and secured thereto in any preferred manner as by cementing or by means of screw fastenings.

To emphasize the internal characteristic markings of the lure, color is preferably applied within the intaglio surfaces as by brushing, staining, dying or the like wherefore a beautiful and attractive effect is achieved through the transparency of the plastic material used for the body portion.

Without intaglio and simply coloring on the inside or other means of decoration in the form of my invention shown in Figs. 7 and 8, the arcuate body portions of the lure externally resemble the lure of Figs. 1 to 6 inclusive. In the form of my invention of Figs. 7 and 8 the spoon 20a is secured to the forward portion of the lure as by embedding it at 20b within the plastic of the forward portion of the lure and cementing the same therein. The pectoral fin 70, is formed integrally with the plastic arcuate body portion. The internal coloring of the lure, furnished by coloring the interior surfaces 61 of the lure either by painting the same or other methods of application of color or by applying decalcomania or colored papers 62 for simulation of fish scales, is reflected through the external surface 63 of the plastic body portions generally as best illustrated in the forward portion of Fig. 8 and as generally indicated in Fig. 7.

In the form of my invention as particularly embodied in the structure of the lure from Figs. 1 to 6 inclusive, I preferably employ a rigid longitudinal rod member 40, having an eyelet 41, and an eyelet 42, at either end thereof; the eyelet 41, being provided to form an attachment for the lead line and the eyelet 42, being provided as an attachment means for a hook 43, disposed rearwardly of the lure and depending therefrom. An auxiliary member 44, is preferably secured as at 45 to the longitudinal member 40, and is formed with a downwardly depending eyelet supporting portion 46 from which an eyelet 47, integrally formed therewith, depends and to which hook means 48 are secured, as best shown in Figs. 1 and 2. It will be noted that a central aperture 50 is provided by means of notches centrally provided in the bottom surface of each body portion through which the extension 46, of the auxiliary member 45, projects.

In the event that a spoon 20, is secured to the undersurface of the forward portion of the lure, as shown in Figs. 1–6 by screw means, a similar opening may be provided by means of notches in the complementary body portions as shown at 51, Fig. 3. It will be noted that with the possible exception of the eyes 13, the external surface of the lure is perfectly smooth and that the body portions 10—11, are identical and symmetrical.

In Fig. 5, I have illustrated a preferred arc of curvature of the external and internal surfaces 60 and 61 of one of the body portions and it will be noted that each of the body portions is formed in the form of a diverging negative lens.

It will be noted that the outer surface 60 and the inner surface 61 are in effect a generally diverging negative meniscus or a diverging negative lens and that an image is formed by changing the direction of the rays of light therethrough.

When colored, as by any preferred color marking means, the rib portions 12 or gill portions 14 are viewed attractively through the external surface 60 and the internal marks and forms are in apparent motion, as best illustrated in Fig. 6, when the lure is moved through the water and as light strikes it from varying angles in its motion.

It is to be noted that the improved lure of my invention achieves the continual effect of two spoons, both being reflected at all angles through the transparent exterior surface of the lure.

The several complementary body portions of the improved lure of my invention are preferably formed by injection or compression molding and are combined after preferably painting or otherwise coloring the intaglio markings, after first placing the hook and line attachment means in the position illustrated in Fig. 1 and then cementing the parts together. The parts are cemented together by means of any preferred cementing composition such as ketones or acetones wherefore the inner hollow body of the lure is hermetically sealed causing it to be weather, air and water proof and thus internal coloring of the markings is unaffected by external influences.

The term internal marking as used in this description is used in the sense that it is intended to comprehend any reflected matter which is in the interior of the lure and which may contact with the exterior of the body and being reflected through the lens shape thereof whereby the lure body is given an illusion of movement.

Although I have described my invention with a certain preferred embodiment of the same, it will be obvious that numerous and extensive departures may be made therefrom, without however departing from the spirit of my invention and the scope of the appended claims.

I claim:

1. An improved fish lure consisting of a hollow formed body portion of substantially transparent material, each of the sides of said body portion being formed as a single divergent meniscus lens.

2. An improved fish lure consisting of a hollow body of substantially transparent material, intaglio skeletal rib substantially arcuate and vertically extending markings in the interior of each of the sides of said body portion, each of the sides of said body portion being formed as a single divergent negative meniscus lens, said intaglio markings being colored.

3. An improved fish lure consisting of a hollow body of substantially transparent material, intaglio skeletal rib substantially vertically extending markings on the interior of the sides of said body portion, each of the sides of said body portion being formed as a single divergent meniscus lens.

References Cited in the file of this patent

UNITED STATES PATENTS

| Number | Name | Date |
|---|---|---|
| 1,089,074 | Pfeiffer | Mar. 3, 1914 |
| 1,637,348 | Ott | Aug. 2, 1927 |
| 1,866,306 | Hunton | July 5, 1932 |
| 2,078,816 | Shenitz | Apr. 27, 1937 |
| 2,127,761 | Beck | Aug. 23, 1938 |
| 2,241,941 | Bates | May 13, 1941 |
| 2,307,200 | Cullerton | Jan. 5, 1943 |
| 2,309,521 | Mabee | Jan. 26, 1943 |
| 2,573,592 | Nickel | Oct. 30, 1951 |

OTHER REFERENCES

Webster's New International Dictionary, 2nd ed., G. & C. Merriam Co., Springfield, Mass., 1937; page 1415, column 3, "Lens."

Piper, text "A First Book of the Lens," pages 21–24. Published by Hagell, Watson and Viney, Ltd., London, 1901.